United States Patent [19]

Reuhkala et al.

[11] Patent Number: 5,781,855
[45] Date of Patent: Jul. 14, 1998

[54] METHOD AND APPARATUS FOR IDENTIFYING CALL RECORDS FOR A CALL IN A CELLULAR COMMUNICATION NETWORK

[75] Inventors: Martti Reuhkala, Vesterby, Finland; John Hayes, Woking Surrey, England; Aarne Lindroos, Stockholm, Sweden

[73] Assignee: Telefonaktiebolaget LM Ericsson, Stockholm, Sweden

[21] Appl. No.: 661,704

[22] Filed: Jun. 11, 1996

Related U.S. Application Data

[63] Continuation of Ser. No. 189,564, Feb. 1, 1994, abandoned.

[51] Int. Cl.⁶ .................................................. H04Q 7/38
[52] U.S. Cl. .................................................. 455/403
[58] Field of Search .................. 370/58; 379/60, 379/59, 62, 63, 91, 119, 132; 380/23; 455/33.1, 54.1, 56.1, 62

[56] References Cited

U.S. PATENT DOCUMENTS

| | | | |
|---|---|---|---|
| 4,776,003 | 10/1988 | Harris | 379/91 |
| 4,788,719 | 11/1988 | Gupta | |
| 4,791,640 | 12/1988 | Sand | 370/58 |
| 4,829,554 | 5/1989 | Barnes et al. | 379/58 |
| 4,920,562 | 4/1990 | Hird et al. | 379/132 |
| 4,955,049 | 9/1990 | Ghisler | 379/58 |
| 5,003,584 | 3/1991 | Benyacar et al. | 379/119 |
| 5,103,475 | 4/1992 | Shuen | |
| 5,210,787 | 5/1993 | Hayes et al. | 379/60 |
| 5,311,572 | 5/1994 | Friedes et al. | 379/67 |
| 5,329,578 | 7/1994 | Brennan et al. | 379/67 |
| 5,436,961 | 7/1995 | Kobayashi | 379/67 |
| 5,442,690 | 8/1995 | Nazif et al. | 379/207 |
| 5,600,705 | 2/1997 | Maenpaa | 379/58 |
| 5,606,560 | 2/1997 | Malek et al. | 370/347 |
| 5,606,596 | 2/1997 | Jain et al. | 379/59 |
| 5,610,919 | 3/1997 | Willard et al. | 370/336 |
| 5,613,201 | 3/1997 | Alford et al. | 455/33.1 |

FOREIGN PATENT DOCUMENTS 483 091    4/1992   European Pat. Off. .
2 273 628  6/1994   United Kingdom .

OTHER PUBLICATIONS

Chu and Hellerstein, "The Exculsive–Writer Approach to Updating Replicated Files in Distributed Processing System", IEEE, Jan. 1985.

Thomas, "Data Integrity In Intelligent Network", IEEE Telecommunications, Jan. 1991.

Warner, "Prepaid Opportunities Explored", Wireless Week, Feb. 10, 1997.

*Primary Examiner*—William Cumming
*Attorney, Agent, or Firm*—Burns, Doane, Swecker & Mathis, L.L.P.

[57] ABSTRACT

A method and apparatus for identifying call records in such a manner as to make it possible for a post processing system to produce one bill based upon information stored in all of the produced call records independently of the node where the record is produced. A unique identification code is generated when a call is setup or when the call enters a network. The identification code is then transferred from node to node as the call is transferred from one node to another. Each node involved in the call produces a call record which contains at least a portion of the identification code. As a result, all of the call records produced for the call can be identified by the identification code stored in the call records.

46 Claims, 6 Drawing Sheets

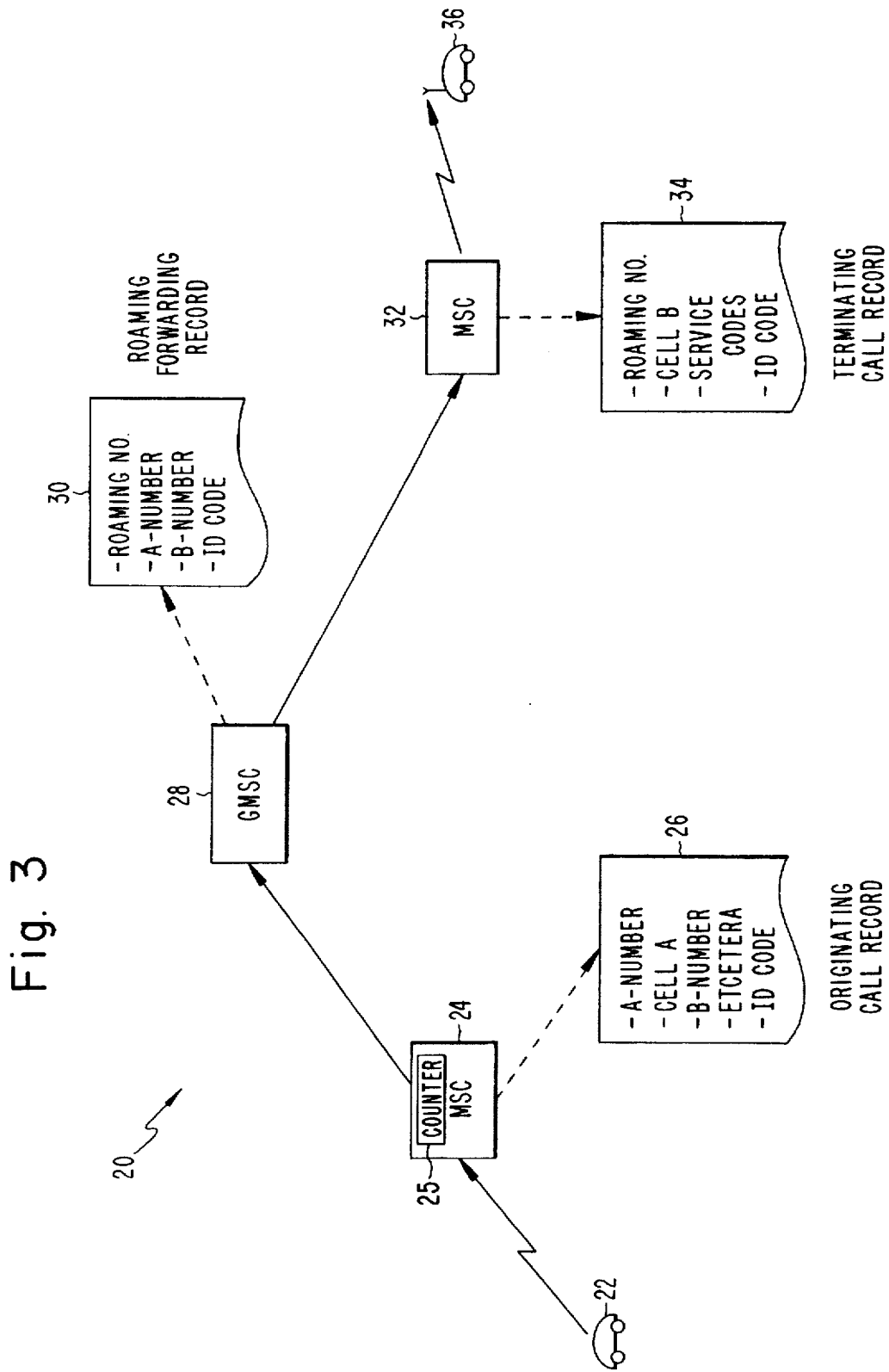

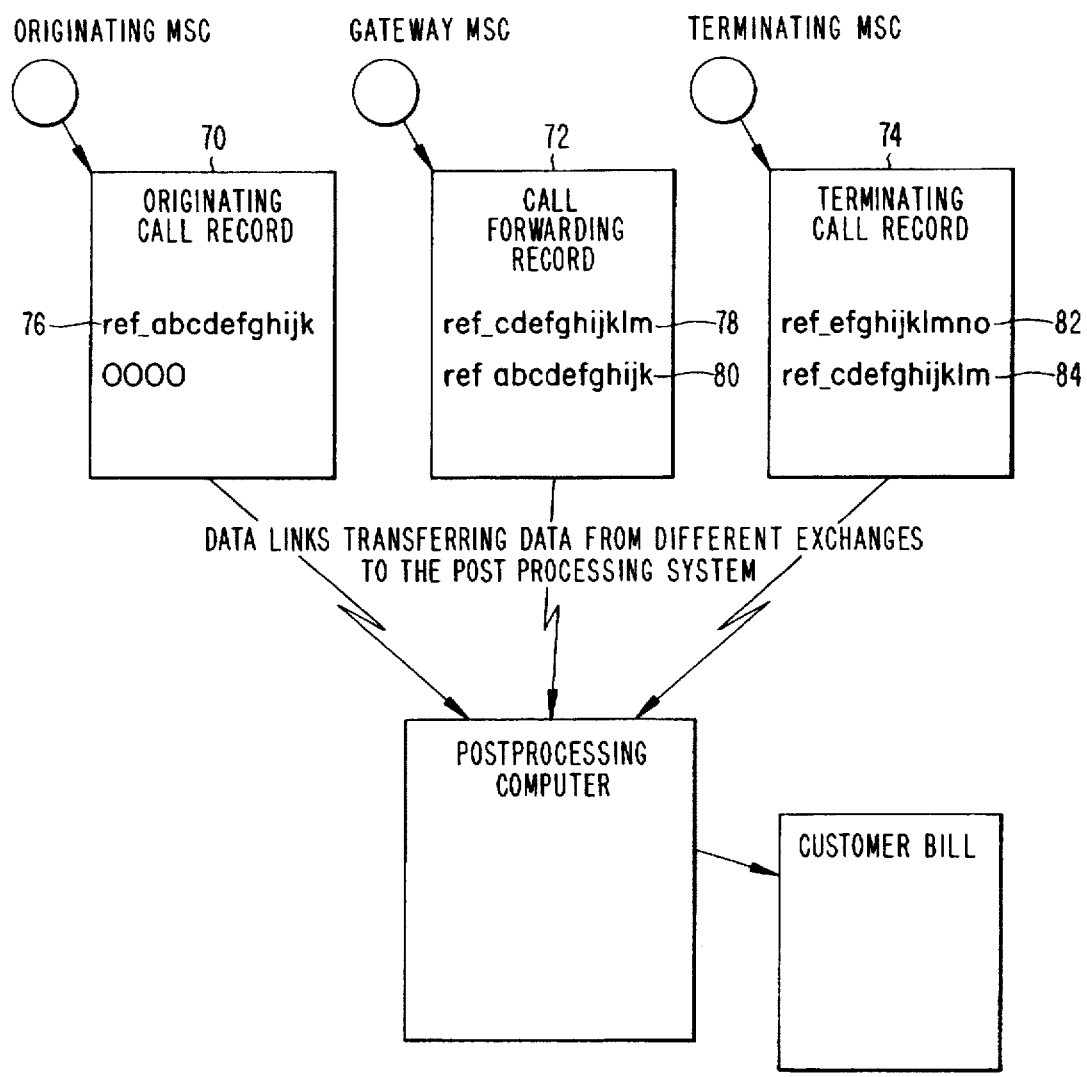

METHOD AND APPARATUS FOR IDENTIFYING CALL RECORDS FOR A CALL IN A CELLULAR COMMUNICATION NETWORK

This application is a continuation of application Ser. No. 08/189,564, filed Feb. 1, 1994 now abandoned.

FIELD OF THE INVENTION

The present invention relates to a billing process for use in a radio telephone communication system, and particularly to a method for marking call records so as to indicate that various call records are related to the same call. The process can also be used for tracing and/or fault finding within the communication system.

BACKGROUND OF THE INVENTION

As cellular networks become larger and as the capacities of these systems increase, the procedure for properly billing customers becomes a more difficult task. The task of properly billing customers is not only complicated by the sheer number of customers but also by the fact that a single call can produce several TT or call data records in a variety of nodes in the cellular system. For example, there can be call data records for the mobile to land connection, a call forwarding operation, a roaming call forwarding operation, and a land to mobile connection. Each of these records could be produced in the same or different nodes depending on the traffic case and the network configuration. Once the call has been completed, a post processing center which processes the charges for the call, must be able to collect all of the call data records in order to properly bill the customer. In presently available systems, the collection of all the related call data records cannot be easily and reliably performed.

One prior art system uses time stamping in an attempt to identify related call records. In time stamping, every record contains a time stamp read from an exchange clock which is accurate to within one second. The time stamp, together with other information, like an A-subscriber number, B-subscriber number, roaming number, etc..., can be used to determine which records belong to the same call. When trying to match a roaming forwarding record with the originating record, the primary search key may be the A-subscriber number. In addition, a comparison of at least B-subscriber numbers and time stamps in the records should also be performed. For a terminating call record, other fields such as roaming numbers, B-subscriber number and the time stamp are compared with the call forwarding records. As a result, as the call chain becomes more complicated, complicated algorithms are required to match the related call records. Furthermore, a large number of searches and comparisons are required in large data files, which might put unreasonable capacity requirements on the post processing system. Another drawback with the time stamping method is that the whole call chain is not verified because there is no possibility to check if all of the records are received and all the required information may not be available because of data link transfer problems. Furthermore, the exchange clocks in different nodes may vary by up to several minutes thus making this method quite unreliable.

In another prior art method, call data records which are produced within the same node or exchange have references to identify to which call they belong. This is done by means of backward referencing. The first record or the mobile originating record has its own identity reference, CallId, and a related call identity reference, ReCallId, as illustrated in FIG. 1. Since the mobile originating record is the first call record, the related call identity reference is zero. The next call record, for example, the call forwarding record in FIG. 1, contains a unique call identity reference and a related call identity reference which is the call identity reference from the originating record. Likewise, a third record (not illustrated) would contain a related call identity reference which is identical to the call identity reference of the call forwarding record. However, this prior art system does not use the references to enable a post processing system to identify call data records in different exchanges.

SUMMARY OF THE INVENTION

It is an object of the present invention to provide a method for identifying individual call records in such a manner as to make it possible for a post processing system to easily produce one bill based upon information stored in all of the produced records independently of the node where the record is produced.

The present invention provides a method for identifying call records for a call on a cellular communication network. First, a unique identification code for identifying the call is assigned to each call when the all is initially set up or when the call enters the network. The identification code is unique until the call has been billed or for a predetermined period of time. The assigned identification code is then stored in a field in an originating call record in a first node. The assigned identification code is then forwarded to at least a second node in the network when the call is set up to at least a second node. After this, the assigned identification code is stored in a field in call records generated by at least a second node, wherein all call records for the call and network are identifiable by the identification code. As a result of the present invention, a post processing system can search for all call records related to a call by searching for all call records which contain a certain identification code. The identification code can either remain the same through all records of a call, or be changed to allow for counting the total number of records in the call or to keep the order of the records. In addition the identification code can vary if identification codes of different records are linked in a list.

According to one embodiment of the present invention, the identification code includes a sequence number, which is the sequence number of the chargeable call, and an exchange number, which identifies the physical node. In another embodiment of the present invention, the identification code also includes an originating country code and an originating network code.

DETAILED DESCRIPTION OF THE DRAWINGS

These and other features and advantages of the invention will be readily apparent to one of ordinary skill in the art from the following written description, used in conjunction with the drawings, in which FIG. 1 illustrates two linked records produced in the same node in a prior art system;

FIG. 3 illustrates a block diagram of a section of a cellular communication system;

FIG. 4 illustrates an identification code according to one embodiment of the present invention;

FIG. 5 illustrates a block diagram of section of a cellular communication system with linked references;

DETAILED DESCRIPTION OF THE DISCLOSURE

The present invention will be described for use in a cellular communication system. It will be readily apparent to one of ordinary skill in the art that the present invention can also be used in other various radio communication systems and is not limited thereto.

According to one embodiment of the present invention, a unique reference or identification code is assigned to each call and is stored in each call data record produced for each individual call. The use of the unique identification code makes it possible to handle all charging information belonging to one single call in an effective way by just searching for all call records that contain the unique identification code. The identification code remains unique until the call is billed or for a predetermined period of time.

Figure 1:
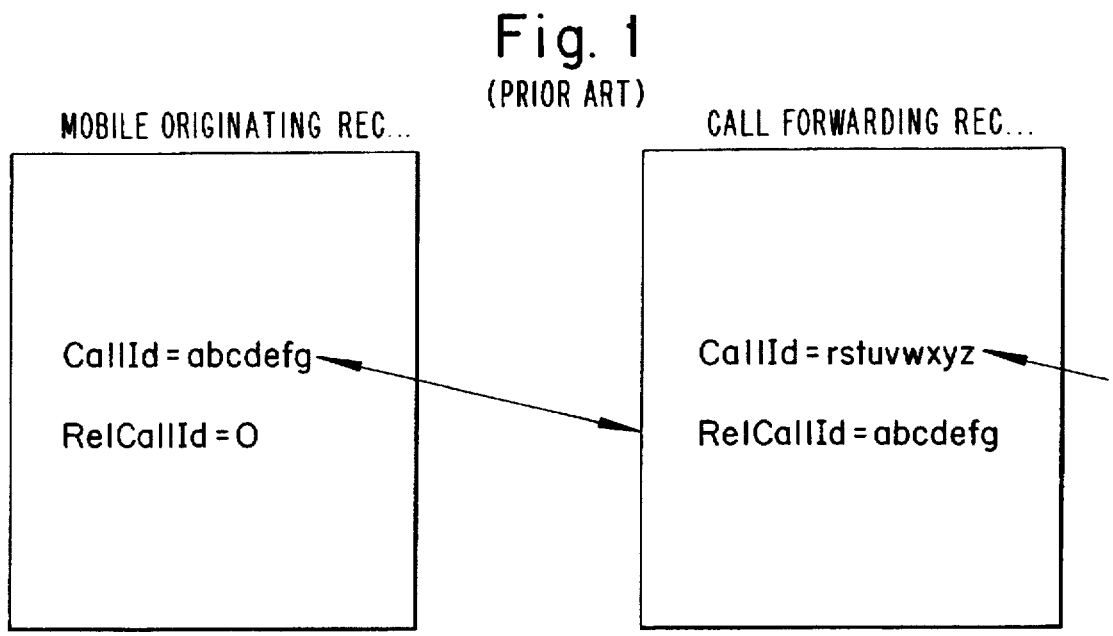
Figure 2:
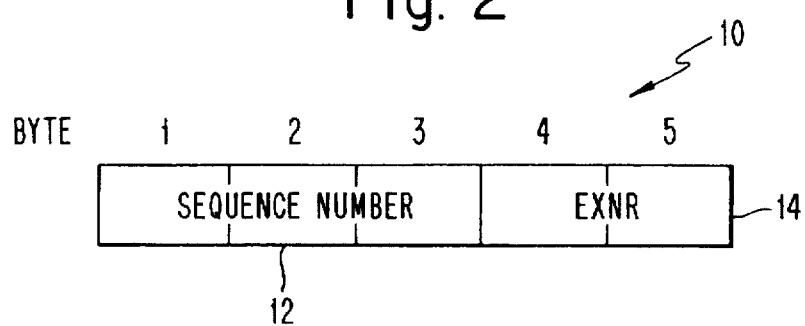
FIG. 2 illustrates the components of the identification code according to one embodiment of the present invention.

FIG. 2 illustrates the components of the identification code 10 which is also known as the global search identity. The call reference number or identification code consists of two parts, a sequence number 12 and an exchange number 14. The sequence number 12 is the sequence number of the chargeable call. The sequence number is generated internally by the first or originating node and the length of the sequence number can vary. The sequence number can be selected in a variety of ways. For example, the sequence number can be selected from a counter 25 which is large enough so that the same value does not occur within a predetermined period of time. After each sequence number is assigned, the counter 25 is incremented, thus creating the next sequence number. In the alternative, the sequence number can be selected from a linked list wherein a limited number of sequence numbers are contained. According to this method, a first-in first-out system is used wherein the sequence number at the top of the list of available sequence numbers is assigned to the next call, and after a call is released, the used sequence number is placed at the back of the list of available sequence numbers.

The exchange number 14 identifies the physical node and has a length of, for example, 16 bits. According to one embodiment of the present invention, the identification code 10 is generated in the node where the call originates, if the call originates within the cellular network, or the node where the call enters the network if the call originates outside the cellular network. For example, if a mobile station 22 is in a cellular network 20 and initiates a call, the node or mobile switching center which is responsible for the area in which the mobile station is located will generate an identification code for the call. On the other hand, if a person outside the cellular network wants to call a mobile phone inside the cellular network, the first node in the cellular system which receives the call setup for the mobile phone in the cellular network generates the identification code. According to another embodiment of the present invention,the identification code can be generated in a foreign communication system from which the call is being forwarded when the communication systems are capable of transferring the identification code. In some embodiments of the present invention, at least a portion of the identification code is transparently transmitted through a different network. As a result, when the call re-enters the originating network, the records generated in the originating network will contain at least a portion of the identification code so that the post-processing system can associate together all call records generated for a call.

FIG. 3 illustrates one embodiment of the present invention wherein a first mobile station 22 telephones a second mobile station 36 within the cellular system 20. When the mobile station 22 attempts to call mobile station 36, the mobile station 22 signals a mobile switching center responsible for the area in which the mobile station 22 is located, i.e., MSC 24. During the call setup, the mobile switching center 24 generates an originating call record 26. The originating call record 26 contains multiple fields and can be configured to the specific desires of the provider of the cellular system. For instance, the originating call record may contain a code identifying the country of origin, and a code identifying the mobile network. These codes may be useful in distinguishing between different communication systems. According to one embodiment of the present invention, the mobile switching center 24 also generates a unique identification code for identifying the call. As described above, the unique identification code can be a consecutive number or a number chosen by means of a linked list. The originating call record 26 also contains a mobile subscriber number, i.e., an A-number, and a cell identity, as well as the dialed phone number (B-number).

The mobile switching center 24 then routes the call and the identification code to a gateway mobile switching center 28 using a standard signalling technique. The gateway mobile switching center interrogates a home location register (not shown) for a number which is used for routing the call further in the network. The number returned from the home location register may be a roaming number or a forwarded to number. The roaming number is used for routing the call to the mobile switching center responsible for the area in which the called mobile subscriber 36 is located. The gateway mobile switching center 28 may generate a roaming forwarding record which contains at least the identification code and may also contain the roaming number, the mobile subscriber number, and the dialed number. Once the gateway mobile switching center 28 has received the roaming number or forwarded to number, the gateway mobile switching center 28 forwards the call and the identification code to a mobile switching center 32 which connects the call to the mobile station 36. After the call is terminated, the mobile switching center 32 generates a terminating call record 34. The terminating call record 34 contains multiple fields which contain, for instance, the roaming number, the cell identity, information about used subscriber services, and the unique identification code. Thus, by forwarding the unique identification code with the call and storing the unique identification code in all of the call data records that are formed during the call, a post processing system can easily search for all of the records pertaining to this particular call by searching the records which contain the unique identification code.

Figure 6:
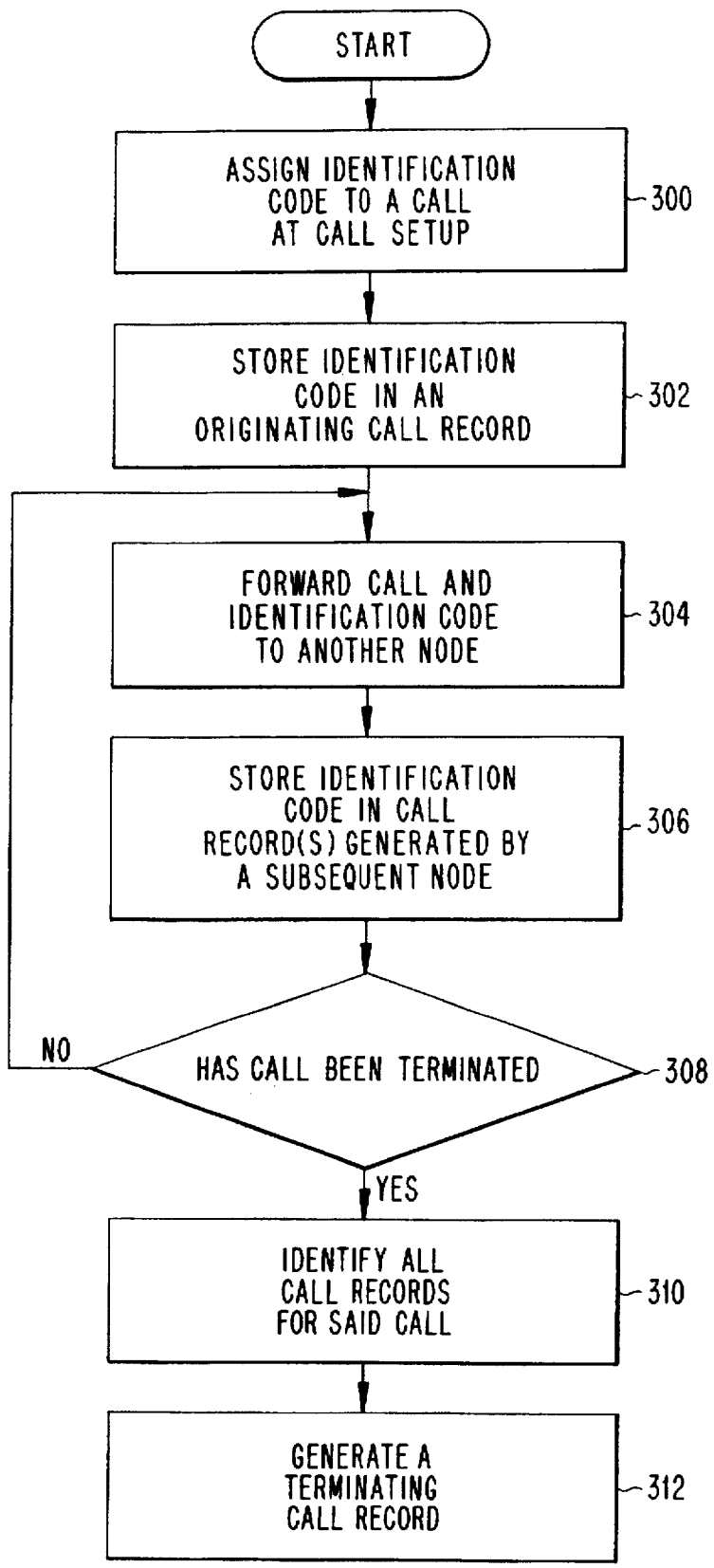
FIG. 6 illustrates a flow chart of the process according to one embodiment of the present invention.

FIG. 6 illustrates a flow chart of one embodiment of the present invention for identifying call records for a call in a cellular communication system. First, the unique identification code for identifying the call is assigned to a call when the call is set up in step 300. The unique identification code is then stored in a field in an originating call record in a first node in step 302. The unique identification code may then be forwarded to at least a second node in the cellular network when the call is forwarded through at least the second node, in step 304. However, the identification code is not forwarded to a second node when the first node can handle the entire call. That is, when the called mobile is roaming within the area of the first node. In step 305, it is determined if the called mobile is located within the current node. If the mobile is not within the current node, the identification code is stored in a field in call records generated by at least the second node, in step 306, wherein all the call records for the call in the network are identifiable in step 310 by the identification code. If the called mobile is in the current node, a terminating call record is generated containing the identification code in step 307 and all of the call records are identified in step 308.

In another embodiment of the present invention, another field is added to each of the call records for indicating the number of call records produced for the call. For instance, the originating call record will contain a field for indicating that it is the first record of a call. Likewise, the roaming forwarding record contain a field indicating that the roaming forwarding record is the second record of the call and the terminating call record will contain a field indicating that it is the third record in the call. A counter could be used to number the call records produced for the call. For example, a field can be added to the identification code which contains a counter as illustrated in FIG. 4. The counter can be set to zero when the identification code is generated, and forwarded together with other information to the next node where it is incremented and output in the record. In addition, the total number of counted call records for the call could be sent back to the originating call mode and stored in the originating call record. For example, it can be sent in the ISUP ACM message. By keeping track of the order of the records produced for a call, the postprocessing system is able to detect whether or not records are missing from the chain of call records.

According to another embodiment of the present invention, each call record contains a field which identifies a previous call record, if it exists. In this embodiment, each node generates a unique node identification code which is different for each call. As illustrated in FIG. 5, an originating call record 70 contains its identification code 76, while the previous call record field is empty indicating that this is the first record of the call. On the other hand, the roaming forwarding record contains its own identification code 78, and a reference 80 to the originating call record 70. Finally, the terminating call record 74 contains its own identification code 82, as well as a reference to the roaming forwarding record 84. According to one embodiment of the present invention, each of the nodes, i.e., the originating MSC, the gateway MSC, and the terminating MSC, generates its own identification codes which are totally independent from each other. According to another embodiment of the present invention, each node identification code contains a code sequence which is unique for each call. In addition, each record could contain a field identifying the next call record. For instance, the identification code 78 identifying the roaming forwarding record could be sent back to the originating call node and stored in the originating call record 70 in a field for "next record". Alternatively, the last record can contain a field, which is used to indicate "the last record" so as to notify the postprocessing system that the last record has been found.

Figure 7:
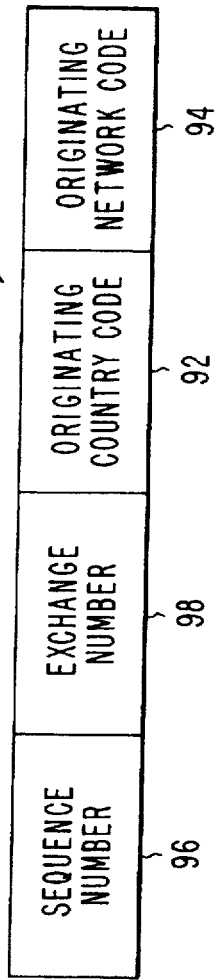
FIG. 7 illustrates a global unique identification code according to one embodiment of the present invention.

According to another embodiment of the present invention, each call can be assigned a global unique identification code which can be used to trace a call through various communication networks. The global unique identification code is illustrated in FIG. 7. The global unique identification code 90 contains the sequence number 96 and the exchange number 98 which are identical to those illustrated in FIG. 2. In addition, the identification code 90 contains an originating country code 92 and an originating network code 94 which are kept the same for the call so that the code will be unique between different networks. The global unique identification code is useful in situations where a foreign network can transparently transfer the identification code. However, if the foreign network is incapable of transparently transferring the identification code, a call routed through the foreign network must be treated as a new call, i.e., assigned a new identification code, when the call reenters the cellular system. If the foreign network is not capable of transferring the identification code assigned to a call from a first network, a last record indicator, for example, a bit switch, may be set in the last call record produced in the first network.

Figure 8:
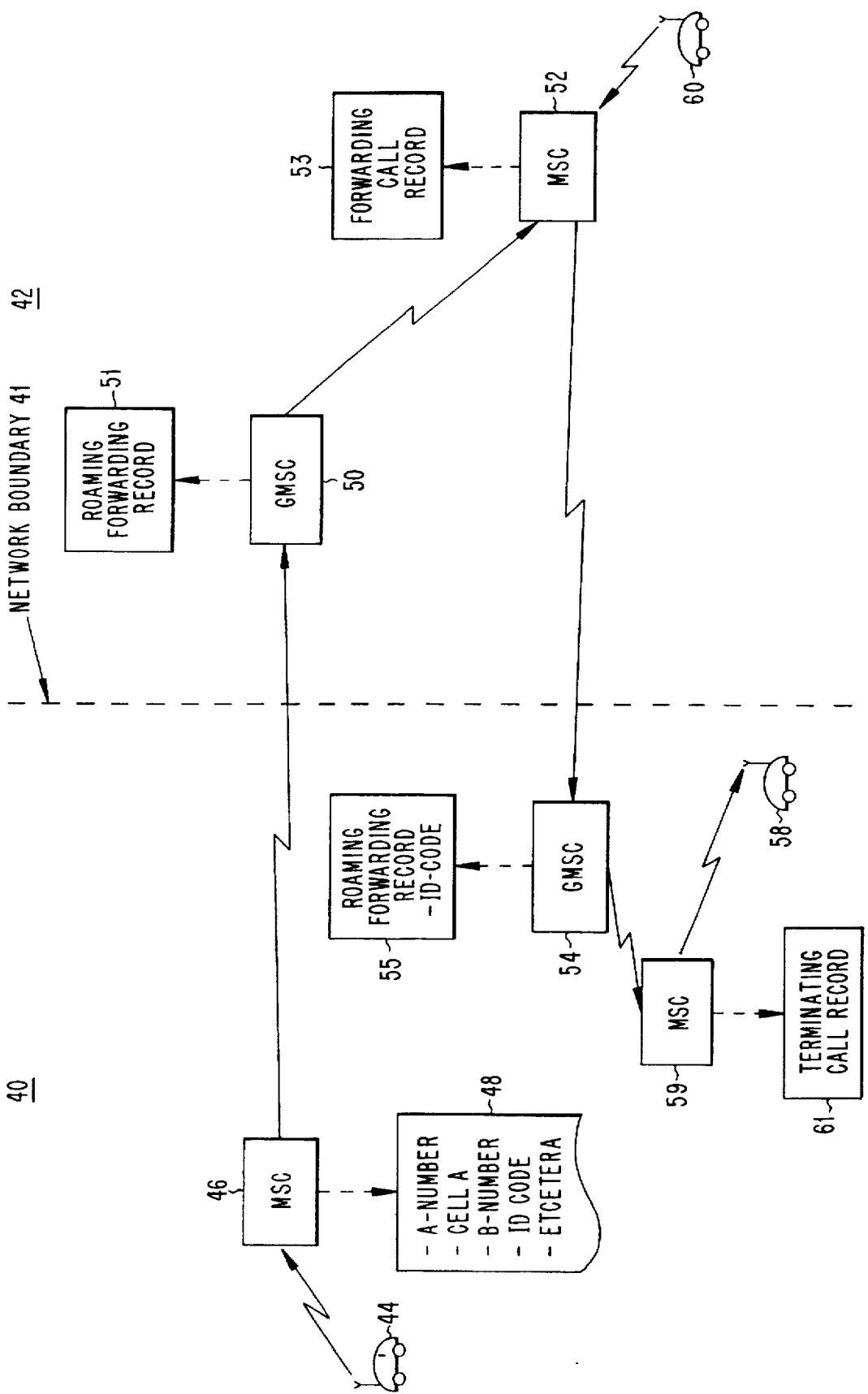
FIG. 8 illustrates a block diagram of sections of different cellular networks.

FIG. 8 illustrates a calling situation in which a call is routed through several networks before the call is completed. In this example, two different communication networks 40 and 42, respectively, are separated by a network border 41. In this example, it is assumed that the communication network 42 can transparently transfer the global unique identification code. When the mobile station 44 attempts to call a mobile station 60, the mobile station 44 signals the mobile switching center 46 which is responsible for the area in which the mobile station 44 is located. During the call setup, the mobile switching center 46 generates an originating call record 48 which contains the global unique identification code for the call. The mobile switching center 46 then routes the call and the identification code to the gateway mobile switching center 50 which is located in the second network 42. The gateway mobile switching center 50 receives a roaming number or a call forwarding number from a home location register (not shown) which is used for further routing the call. In this example, the call and the identification code is routed to a mobile switching center 52. The mobile switching center 52 then attempts to connect the call to the mobile station 60. In this example, however, the subscriber does not reply to the call, so the call is forwarded to a mobile station 58 in accordance with a conditional call forwarding procedure set up by the subscriber. As a result, the mobile switching center 52 creates a forwarding call record 53 and forwards the call and the global unique identification code to the gateway mobile switching center 54. The gateway mobile switching center 54 creates a roaming forwarding record 55 which contains the global unique identification code and directs the call to the mobile switching center 59. The mobile switching center then directs the call to the mobile station 58. After the call is terminated, the mobile switching center 59 creates a "terminating call record" or "last call record" which contains the global unique identification code for the call. Consequently, all of the call records within the network 40 contain the global unique identification code for the call.

Figure 9:
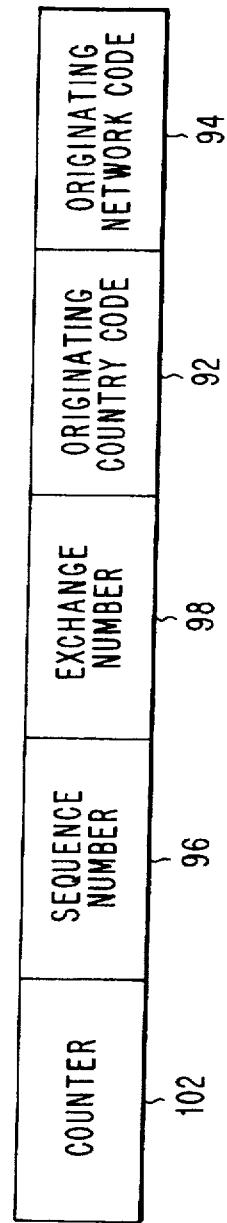
FIG. 9 illustrates a global unique identification code according to one embodiment of the present invention.

According to another embodiment of the present invention, a counter can be added to the global unique identification code. As illustrated in FIG. 9, the global identification code 100 contains, in addition to the originating country code 92, the originating network code 94, the sequence number 96, and the exchange number 98, a counter 102 which is incremented each time a call record is generated. As a result, an order of the records can be kept which enables the postprocessing system to detect missing records. In addition, the order of the records can also be used for tracing and fault detection investigations.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

We claim:

1. A method for identifying call records for a call in a cellular communication network, comprising the steps of:
   assigning each call a unique identification code for identifying the call when the call is set up;
   generating, at a first node, an originating call record comprising a first portion of call related information;
   storing said identification code in a field in said originating call record in the first node;
   forwarding said identification code to at least a second node in the network when the call is forwarded through at least the second node; generating, at said at least one second node, at least one subsequent call record comprising subsequent portions of call related information; and
   storing said identification code in a field in call records generated by at least said second node, wherein all call records for the call in the network are identifiable by at least a portion of the identification code so as to enable identification of said originating call record and said at least one subsequent call record as relating to the same call at postprocessing of call records generated at said first node and said at least one second node.

2. A method for identifying call records for a call according to claim 1, wherein said step of assigning further comprises the step of including a sequence number and an exchange number in said identification code.

3. A method for identifying call records for a call according to claim 2, wherein said exchange number is the exchange number of the first node.

4. A method for identifying call records for a call according to claim 2, wherein said sequence number is selected from a counter which is incremented after each sequence number is assigned.

5. A method for identifying call records for a call according to claim 2, wherein said sequence number is selected from a linked list of available sequence numbers.

6. A method for identifying call records for a call according to claim 1, wherein said identification code is forwarded in a setup message to at least the second node.

7. A method for identifying call records for a call according to claim 1, wherein the unique identification code is generated at a node where the call enters the network.

8. A method for identifying call records for a call according to claim 1, wherein the unique identification code is generated in another network from which the call is being forwarded.

9. A method for identifying call records for a call according to claim 2, wherein part of said identification code is generated by a counter.

10. A method for identifying call records for a call according to claim 9, further comprising the step of:
    assigning each call record in sequence a consecutive number from the originating call record to a terminating call record by incrementing said counter.

11. A method for identifying call records for a call according to claim 10, wherein the number from the terminating call record is transmitted back to the first node and stored in the originating call record.

12. A method for identifying call records for a call according to claim 1, further comprising the step of using a last record indicator to indicate a terminating call record for the call.

13. A method for identifying call records for a call according to claim 12, wherein said indicator is a bit switch.

14. A method for identifying call records for a call according to claim 2, wherein said step of assigning further comprises the step of including an originating country code and an originating network code in said identification code.

15. A method for identifying call records for a call according to claim 14, wherein said identification code is transferred to a new cellular network when he call enters the new cellular network.

16. A method for identifying call records for a call according to claim 15, wherein at least a portion of the identification code is transparently transferred through said new cellular network, said at least a portion of the identification code being transparent to said new cellular network.

17. A method for identifying call records for a call according to claim 14, wherein part of said identification code is generated by a counter.

18. A method for identifying call records for a call according to claim 17, further comprising the step of:
    assigning each call record in sequence a consecutive number from the originating call record to a terminating call record by incrementing said counter.

19. A method for identifying call records for a call according to claim 18, wherein the number from the terminating call record is transmitted back to the first node and stored in the originating call record.

20. A system for identifying call records for a call in at least one cellular communication network, comprising:
    means for assigning each call a unique identification code for identifying the call when the call is set up;
    means for generating, at a first node, an originating call record comprising a first portion of call related information;
    storing means for storing said identification code in a field in said originating call record in a first node;
    means for forwarding said identification code to at least a second node in the network when the call is forwarded through at least the second node;
    means for generating, at said at least one second node, at least one subsequent call record comprising subsequent portion of call related information; and
    storing means for storing said identification code in a field in call records generated by at least said second node, wherein all call records for the call in the network are identifiable by at least a portion of the identification code so as to enable identification of said originating call record and at least one subsequent call record as relating to the same call at postprocessing of call records generated at said first node and said at least one second node.

21. A system for identifying call records for a call according to claim 20, wherein said identification code includes a sequence number and an exchange number.

22. A system for identifying call records for a call according to claim 21, further comprising means for including as said exchange number the exchange number of the first node.

23. A system for identifying call records for a call according to claim 21, wherein said sequence number is selected from a counter which is incremented after each sequence number is assigned.

24. A system for identifying call records for a call according to claim 21, wherein said sequence number is selected from a linked list of available sequence numbers.

25. A system for identifying call records for a call according to claim 20, wherein said identification code is forwarded in a setup message to at least the second node.

26. A system for identifying call records for a call according to claim 20, wherein the unique identification code is generated at a node where the call enters the network.

27. A system for identifying call records for a call according to claim 20, wherein the unique identification code is generated in another network from which the call is being forwarded.

28. A system for identifying call records for a call according to claim 21, wherein part of said identification code is generated by a counter.

29. A system for identifying call records for a call according to claim 28, further comprising:

means for assigning each call record in sequence a consecutive number from the originating call record to a terminating call record by incrementing said counter.

30. A system for identifying call records for a call according to claim 29, further comprising:

means for transmitting the consecutive number referring to the terminating call record back to the first node; and means for storing the consecutive numbers in the originating call record.

31. A system for identifying call records for a call according to claim 20, wherein a terminating call record contains a last record indicator.

32. A system for identifying call records for a call according to claim 31, wherein said indicator is a bit switch.

33. A system for identifying call records for a call according to claim 21, wherein said identification code further includes an originating country code and an originating network code.

34. A system for identifying call records for a call according to claim 33, wherein said identification code is transferred to a new cellular network when the call enters the new cellular network.

35. A system for identifying call records for a call according to claim 33, wherein part of said identification code is generated by a counter.

36. A system for identifying call records for a call according to claim 35, further comprising:

means for assigning each call record in sequence a consecutive number from the originating call record to a terminating call record by incrementing said counter.

37. A system for identifying call records for a call according to claim 36, further comprising:

means for transmitting the consecutive number referring to the terminating call record back to the first node; and means for storing the consecutive number referring to the terminating call record in the originating call record.

38. A method for identifying call records for a call in a cellular communication network, comprising the steps of:

forwarding a call through at least a first and a second node;

generating at each node through which said call is forwarded a node identification code unique for each call and node;

generating, at said first node, an originating call record comprising a first portion of call related information;

storing said node identification code in a field in a call record which is generated at each node for said call;

transferring said node identification code generated at a previous node to a next node;

generating, at subsequent nodes, at least one subsequent call record comprising subsequent portions of call related information; and storing said transferred node identification code in a field in the call record generated at said next node, wherein the call records generated for the call are identified by a chain of node identification codes that are stored in the call records.

39. A method for identifying call records for a call according to claim 38, further comprising the steps of:

assigning each call a unique call identification code for identifying the call when the call is set up;

transferring said call identification code to each node that the call is transferred to; and including said call identification code as a part of said node identification code when generating the node identification code.

40. A method for identifying call records for a call according to claim 38, further comprising the steps of:

transferring said node identification code to a previous node; and storing said node identification code in a field in the call record generated at said previous node.

41. A system for identifying call records for a call in a cellular communication network, comprising:

means for forwarding a call through at least a first and a second node;

means for generating at each node through which said call is forwarded a node identification code unique for each call and node;

means for generating, at said first node, an originating call record comprising a first portion of call related information;

means for storing said node identification code in a field in a call record which is generated at each node for said call;

means for transferring said node identification code generated at a previous node to a next node;

means for generating, at subsequent nodes, at least one subsequent call record comprising subsequent portions of call related information; and means for storing said transferred node identification code in a field in the call record generated at said next node, wherein the call records generated for the call are identified by a chain of node identification codes that are stored in the call records.

42. A system for identifying call records for a call according to claim 41, further comprising:

means for assigning each call a unique call identification code for identifying the call when the call is set up;

means for transferring said call identification code to each node that the call is transferred to means for including said call identification code as a part of said node identification code when generating the node identification code.

43. A system for identifying call records for a call according to claim 41, further comprising:

means for transferring said node identification code to a previous node; and means for storing said node identification code in a field in the call record generated at said previous node.

44. A system for identifying call records for a call according to claim 39, wherein at least a portion of the identification code is transparently transferred through said new cellular network, said at least a portion of the identification code being transparent to said new cellular network.

45. A method of assembling first call related billing information, being stored in a first call record generated at a first node, and second call related billing information stored in at least one second call record generated at at least one second node, for a single call in a cellular communication network comprising the steps of:

assigning the call an identification code which uniquely identifies the call when the call is set up;

generating, at a first node, said first call record comprising a first portion of call related information;

storing said identification code in a field in said first call record;

forwarding said identification code to said at least one second node when the call is forwarded through said at least one second node;

generating, at said at least second node, said at least one second call record comprising subsequent portions of call related information;

storing said identification code in a field in said at least one second call record; and identifying said first call record and said at least one second call record as relating to the same call using said identification code.

46. A method for identifying call records for a call according to claim 1, wherein each call record contains a specific portion of call related information.

\* \* \* \* \*